United States Patent
Kang et al.

(10) Patent No.: US 7,991,349 B2
(45) Date of Patent: Aug. 2, 2011

(54) METHOD AND SYSTEM FOR PROVIDING INFORMATION WHICH RELATES IN BROADCASTING

(75) Inventors: Moon-Soon Kang, Seongnam-si (KR); Eun-Hui Moon, Suwon-si (KR)

(73) Assignee: KT Corporation, Seongnam-si (KR)

( * ) Notice: Subject to any disclaimer, the term of this patent is extended or adjusted under 35 U.S.C. 154(b) by 737 days.

(21) Appl. No.: 11/985,818

(22) Filed: Nov. 16, 2007

(65) Prior Publication Data

US 2008/0148316 A1    Jun. 19, 2008

Related U.S. Application Data

(63) Continuation of application No. PCT/KR2006/004397, filed on Oct. 26, 2006.

(30) Foreign Application Priority Data

Oct. 28, 2005    (KR) ........................ 10-2005-0102076

(51) Int. Cl.
    *H04H 60/09*    (2008.01)
(52) U.S. Cl. .................................. 455/3.04; 348/14.02
(58) Field of Classification Search ................. 455/3.06, 455/3.01, 418, 66
See application file for complete search history.

(56) References Cited

U.S. PATENT DOCUMENTS

| | | | |
|---|---|---|---|
| 6,925,489 B1 * | 8/2005 | Curtin ............................ | 709/217 |
| 2002/0026457 A1 | 2/2002 | Jensen | |
| 2002/0111134 A1 * | 8/2002 | Salurso et al. ............... | 455/3.06 |
| 2004/0059720 A1 | 3/2004 | Rodriguez | |

FOREIGN PATENT DOCUMENTS

| | | |
|---|---|---|
| JP | 2001-273305 | 10/2001 |
| JP | 2001-273305 A | 10/2001 |
| KR | 2005 0044838 A | 5/2005 |
| KR | 2005 0048980 A | 5/2005 |

OTHER PUBLICATIONS

Office Action for Japanese application No. 2007-549286 dated May 18, 2010 by Japanese Patent Office.
International Search Report dated Feb. 5, 2007 by Korean Intellectual Property Office.
Japanese Office Action dated Jan. 18, 2011 for Application No. 2007-549286, Abstract only.

* cited by examiner

*Primary Examiner* — Tu X Nguyen
(74) *Attorney, Agent, or Firm* — Knobbe Martens Olson & Bear LLP

(57) ABSTRACT

A system and method for providing information which relates in broadcasting are disclosed. In one aspect, there is a system, which includes: a first data transceiver receiving audio and time information related to the broadcast content from a mobile communication terminal; an information analyser determining a broadcast program containing the audio information, using the audio and time information, and generating the determined broadcast content information extraction command; and a broadcast content information mapper reading broadcast content information related to the determined broadcast program from a database storing the broadcast content information, where the broadcast content provider server provides the read broadcast content information to the mobile communication terminal. In another aspect, a method of receiving broadcast content information includes transmitting audio and time information related to the audio information to the broadcast content provider server, and receiving a broadcast content information from the broadcast content provider server.

14 Claims, 7 Drawing Sheets

METHOD AND SYSTEM FOR PROVIDING INFORMATION WHICH RELATES IN BROADCASTING

RELATED APPLICATIONS

This application is a continuation application, and claims the benefit under 35 U.S.C. §§120 and 365 of PCT Application No. PCT/KR2006/004397, filed on Oct. 26, 2006, which is hereby incorporated by reference in its entirety.

BACKGROUND OF THE INVENTION

1. Field of Invention

The present invention relates to a method and system for providing broadcast content, more particularly to a method and system for providing broadcast content information related to broadcast programs.

2. Description of the Related Technology

With remarkable developments in telecommunications, the mobile communication terminal is being equipped with various multimedia functions such as MP3, video, and broadcasting, etc., on top of the main function as a telephone. Also, there is currently being established a convergence environment within the mobile communication terminal, examples of which include providing TV and radio tuner functions, and providing DMB (Digital Multimedia Broadcasting) functions. However, a broadcast program provided by satellite broadcasting, airwave broadcasting, satellite DMB, and groundwave DMB, etc., is provided in a form produced by each broadcasting company and provided unidirectionally. To resolve this, information related to a broadcast program may be provided together, using an EPG (Electronic Program Guide), to the mobile communication terminal, so that when a user presses a certain key in order to view the information related to a broadcast program, an access may be made to the wireless Internet to be provided with detailed information corresponding to the broadcast contents information of interest.

However, this entails the inconvenience of having to manipulate several keys to be provided with the information related to a broadcast program, and at present, the information provided is mostly centered on texts or still images.

Furthermore, this method requires the user to separately access the wireless Internet for information related to a broadcast content, in the middle of viewing the broadcast content.

SUMMARY OF CERTAIN INVENTIVE ASPECTS

To resolve such problems of prior art as described above, the present invention aims to present a method and system which allow a user to receive, using a mobile communication terminal, broadcast content information related to a broadcast program being viewed or listened to through a user terminal.

Another aim of the present invention is to present a method and system with which broadcast content information related to a broadcast program can be received in real time with a single key button manipulation.

Still another aim of the present invention is to present a method and system which allow bidirectional communication with regard to a broadcast program provided unidirectionally.

Yet another aim of the present invention is to present a method and system with which related broadcast content information can be provided even for a broadcast program that does not provide broadcast content information, such as an analog broadcast.

To achieve the objectives set forth above, one aspect of the present invention provides a system connected to a mobile communication terminal and a broadcasting company by a communication network, which provides a broadcast content, or broadcast content information related to the broadcast content, to the mobile communication terminal.

According to an embodiment of the present invention, a broadcast content provider server connected to a mobile communication terminal by a communication network for providing a broadcast content to the mobile communication terminal may be provided, which includes: a first data transceiver part configured to receive audio information of the broadcast content and time information related to the broadcast content from the mobile communication terminal; an information analysis part configured to determine a broadcast program containing the audio information, using the audio information and the time information, and to generate the determined broadcast content information extraction command; and a broadcast content information mapping part configured to read broadcast content information related to the determined broadcast program from a database storing the broadcast content information, in response to the broadcast content information extraction command, where the broadcast content provider server provides the read broadcast content information to the mobile communication terminal through the first data transceiver part.

According to another embodiment of the present invention, a mobile communication terminal connected to a broadcast content provider server by a communication network to receive broadcast content information from the broadcast content provider server may be provided, which includes: an input part configured to receive a broadcast content information display command as input from a user; a sound input part configured to receive external sounds as input; a control part configured to generate an audio information extraction command in response to the broadcast content information display command; an audio information extraction part configured to extract the sounds inputted from the sound input part for a predetermined length of time, in response to the audio information extraction command, and generate audio information and time information related to the audio information; and a transceiver part configured to transmit the audio information and the time information to the broadcast content provider server by means of a control of the control part.

Another aspect of the present invention provides a method of providing broadcast content information, in a system connected to a mobile communication terminal and a broadcasting company by a communication network, for providing a broadcast content, or broadcast content information related to the broadcast content, to the mobile communication terminal.

According to an embodiment of the present invention, a method of providing broadcast content information performed in a broadcast content provider server connected to a mobile communication terminal and one or more broadcasting companies by a communication network to provide broadcast content information to the mobile communication terminal may be provided, which includes: receiving audio information and time information related to the audio information from the mobile communication terminal; determining a broadcast program containing the audio information, using the audio information and the time information, and generating a broadcast content information extraction command related to the determined broadcast program; reading broadcast content information, in response to the broadcast content information extraction command, from a broadcast content information database storing broadcast content information related to broadcast programs; and transmitting the read broadcast content information to the mobile communication terminal.

According to aspects of the present invention, a user can automatically receive broadcast content information related to a broadcast program being viewed and/or listened to through a user terminal.

In addition, broadcast content information related to a broadcast program can be received in real time with a single key manipulation, for greater user convenience.

Further, related broadcast content information can be provided even for a broadcast program that does not provide broadcast content information, such as an analog broadcast, to allow bidirectional communication.

DETAILED DESCRIPTION OF CERTAIN INVENTIVE EMBODIMENTS

Figure 1:
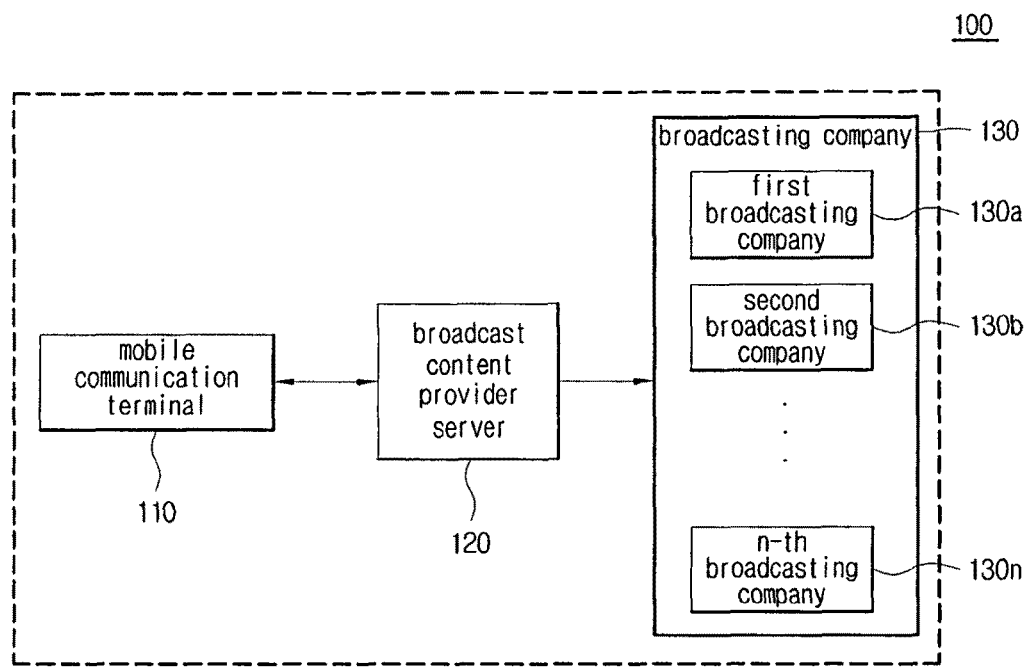
FIG. 1 is a block diagram representing a broadcast content provider system according to an embodiment of the present invention.

The present invention allows for various modifications and several embodiments, where particular embodiments are illustrated in the drawings and described in detail in the following descriptions. However, it is to be appreciated that the present invention is not limited to particular modes of practice, but rather encompasses all modifications, equivalents, and substitutions that do not depart from the spirit and scope of the present invention. In describing the drawings, like reference numerals were used to refer to like elements.

Embodiments of the present invention will be described below in more detail with reference to the accompanying drawings. In the description with reference to the accompanying drawings, like reference numerals refer to the like elements regardless of the figure number, and redundant explanations are omitted. In the description of the present invention, detailed explanations of previously disclosed art are omitted when it is deemed that they may unnecessarily obscure the essence of the present invention.

The present invention relates to a system and method for providing broadcast content information (e.g. filming location information for a certain scene, filming location reservation information, actor/actress information, actor/actress wardrobe information, survey information, audience participation information, etc.) related to a broadcast of a broadcasting company that provides airwave broadcasting, satellite broadcasting, satellite DMB, or groundwave DMB, etc., in real time to a mobile communication terminal 110. A broadcast content provider system 100 according to an aspect of the present invention can also provide content information to the mobile communication terminal 110 even for broadcast programs that do not provide content information related to the broadcast programs, such as broadcast programs provided via airwaves, such as KBS, MBC, and SBS, for example, by generating the content information. For convenience in understanding and explanation, the description will be based on the assumption that software is installed on the mobile communication terminal 110 that can execute applications for executing the broadcast content information provided from the broadcast content provider server 120. Also, the broadcast program in the present specification may be a broadcast or advertisement, etc., provided by each broadcasting company 130 or advertisement producer (not shown), etc., through a user terminal (not shown, may be a TV set, radio, etc.). Of course, it may also be other information provided to the user terminal (not shown) besides broadcasts or advertisements.

Figure 2:
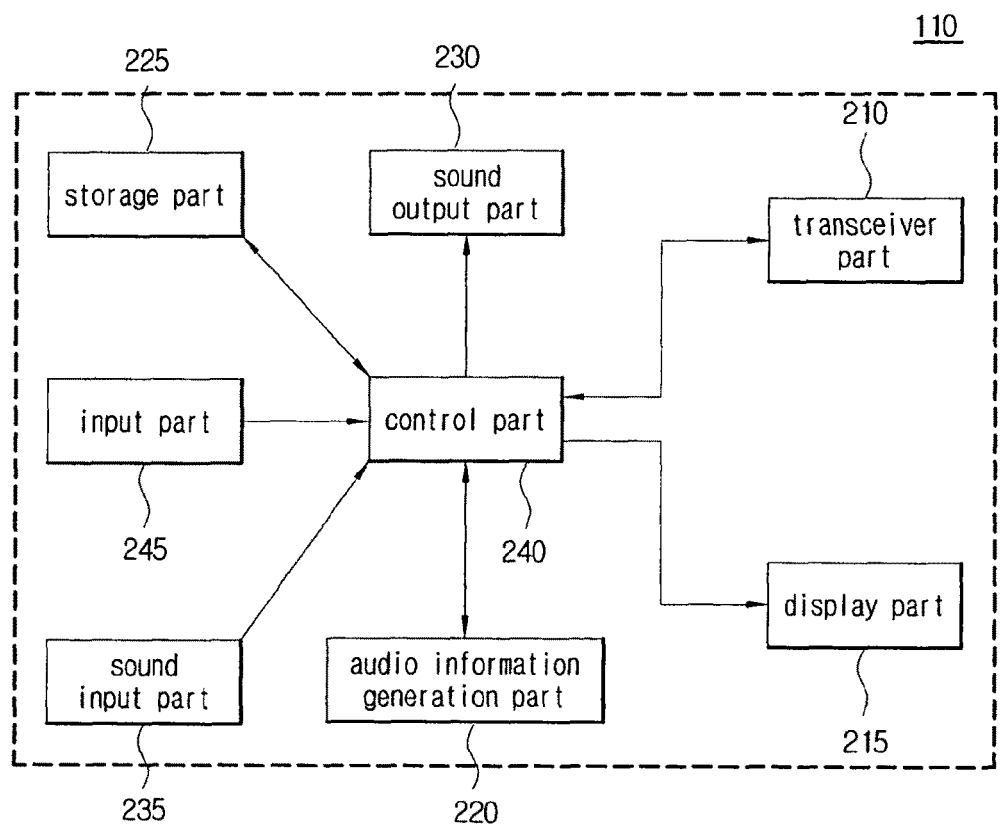
FIG. 2 is an interior block diagram of a mobile communication terminal according to an embodiment of the present invention.
Figure 3:
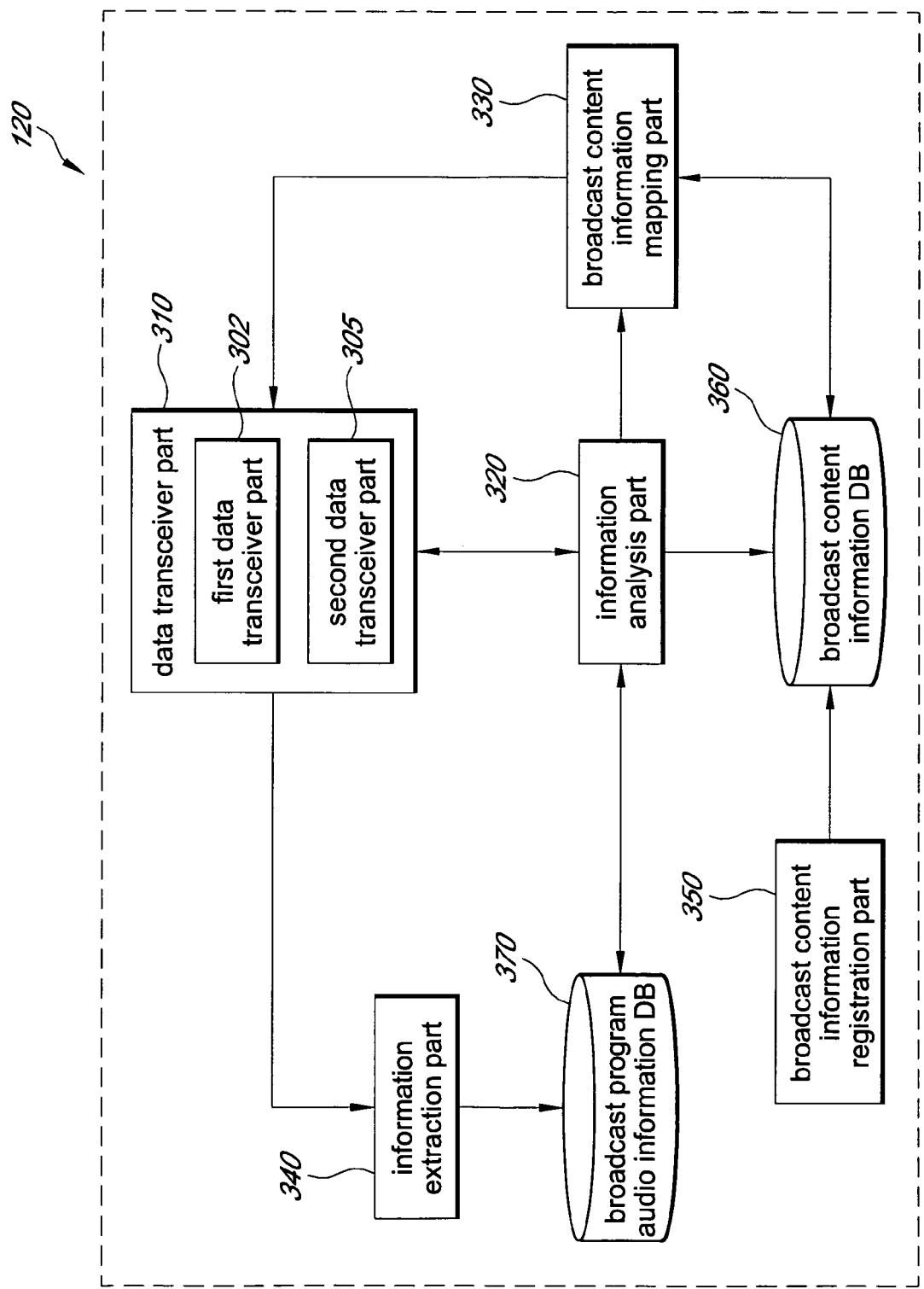
FIG. 3 is a block diagram representing a broadcast content provider server according to an embodiment of the present invention.

FIG. 1 is a block diagram representing a broadcast content provider system according to an embodiment of the present invention, FIG. 2 is an interior block diagram of a mobile communication terminal according to an embodiment of the present invention, and FIG. 3 is a block diagram representing a broadcast content provider server according to an embodiment of the present invention.

As seen in FIG. 1, a broadcast content provider system 100 according to an aspect of the present invention is composed of a mobile communication terminal 110, broadcast content provider server 120, first broadcasting company 130a, second broadcasting company 130b, . . . , n-th broadcasting company 130n, where each is connected to a communication network. Also, the broadcast content provider system 100 may include a module (not shown) which receives programs of each broadcasting company 130, and may receive broadcast content information provided by each broadcasting company 130 in real time through the corresponding module.

Here, the communication network may include mobile communication networks and wired or wireless Internet networks, that comprise a BTS (Base Transceiver Station), BSC (Base Station Controller), and PDSN (Packet Data Serving Node).

Referring to FIG. 2, the mobile communication terminal 110 comprises a transceiver part 210, a display part 215, an audio information extraction part 220, a storage part 225, a sound output part 230, a sound input part 235, an input part 245, and a control part 240.

The transceiver part 210 performs the function of exchanging data with the broadcast content provider server 120 over a communication network. For example, the transceiver part 210 may receive broadcast content information from the broadcast content provider server 120 and transfer it to the control part 240. Also, the transceiver part 210 may transmit audio information and time information, generated by the control of the control part 240 for a predetermined length of time of a certain broadcast program, to the content provider server 120 through the communication network. Here, the broadcast program may be a broadcast received from a broadcasting company 130 and being viewed or listened to through a user terminal (e.g. a TV set, radio, etc.). Of course, it is apparent that the user terminal (not shown) may also be a form of media other than a TV set or radio. Here, the time information may be the starting time of extracting the pertinent audio information, the finishing time of extracting the pertinent audio information extraction, etc.

In the present specification, the broadcast content information is defined as information provided supplementarily in relation to a broadcast content, such as filming location information for a certain scene, filming location reservation information, actor/actress information, actor/actress wardrobe information, survey information, audience participation information, etc. The broadcast content information may also include types of information related to a certain broadcast program or advertisement, etc., not mentioned in the present specification, which can be provided supplementarily through a mobile communication terminal 110 other than the user terminal (not shown).

Here, a user may input a broadcast content display command through the input part 245 for displaying broadcast content information, at which audio information, generated in predetermined intervals for a certain length of time, may be transmitted to the broadcast content provider server 120, whereby the broadcast content information may be provided from the broadcast content provider server 120 in correspondence to the audio information.

The display part 215 is a means for outputting the broadcast content information by the control of the control part 240. Here, the broadcast content information may be text data, numerical data, or image data, etc. The display part 215 may be, for example, an LCD (Liquid Crystal Display).

The audio information extraction part 220, by the control of the control part 240, extracts the audio information of a certain broadcast program inputted from the sound input part 235 in predetermined intervals for a predetermined length of time, and transfers it to the control part 240. For example, let us assume that the predetermined time interval is, for instance, 1 minute, and that the audio information of the broadcast content is extracted, for instance, for 5 seconds. Then, the audio information extraction part 220, by the control of the control part 240, extracts the audio data inputted from the sound input part 235 in intervals of 1 minute, for audio information of a 5 second period (The audio information extracted from the audio information extraction part 220 will hereinafter be referred to as "extracted audio information."). Also, the audio information extraction part 220 may generate extraction time information of the extracted audio information (e.g. extraction starting time of the extracted audio information, extraction finishing time of the extracted audio information, etc.) and transfer it to the control part 240.

The storage part 225 stores operating programs of the mobile communication terminal 110, programs corresponding to applications for executing the broadcast content received from the broadcast content provider server 120, the extracted audio information and time information, broadcast content information (e.g. filming location information for a certain scene, filming location reservation information, actor/actress information, actor/actress wardrobe information, survey information, audience participation information, etc.) received from the broadcast content provider server 120 in correspondence to the extracted audio information, and predetermined algorithms, etc. Of course, other types of information may also be stored in the storage part 225.

The sound output part 230 is a means for outputting sounds received in correspondence to the broadcast content provided from the broadcast content provider server 120, and may be, for example, a speaker.

The sound input part 235, by the control of the control part 240, receives one or more analog sound data as input, and transfers it to the control part 240. The sound input part 235 may, for instance, be a microphone. For example, the sound input part 240 may start operation, by the control of the control part 240, when a function button corresponding to a broadcast content information display command is pressed by the user through the input part 245.

The input part 245 is a means to receive as input from the user control commands for controlling the operation of the mobile communication terminal, function selection commands (e.g. broadcast content information display command), etc. For example, the input part 245 may be implemented as a plurality of key buttons (e.g. alphanumerical keys, symbol keys of * or #, and one or more function keys—a menu key, send key, OK key, and a key for accessing the wireless Internet, etc.) or may be implemented as a touch screen, etc.

The control part 240 performs the function of controlling each of the components (e.g. the transceiver part 210, display part 215, audio information extraction part 220, storage part 225, sound output part 230, sound input part 235, input part 245, etc.) of the mobile communication terminal 110 according to an aspect of the present invention. Also, when the broadcast content information display command is inputted by the user through the input part 245, the control part 240 may transfer a control command to the sound input part 235 for starting the operation of the sound input part 235. Furthermore, the control part 240 may also order the start of operation of the audio information extraction part 220 in correspondence to the start of operation of the sound input part 235. Thus, when the broadcast content information display command is inputted, the audio information extraction part 220 may extract the audio information of the broadcast program inputted through the sound input part 235 for a predetermined length of time, to generate the extracted audio information and time information and transfer them to the control part 240.

Hereinafter, the command for ordering the start of operation of the sound input part 235 and audio information extraction part 220 for prompting the control part 240 to extract the audio information of a certain broadcast program, when a function button corresponding to the broadcast content information display command is pressed by the user through the input part 245, is defined as the "audio information generation control command."

For example, let us assume that the user is viewing a certain broadcast program through a user terminal (not shown). Here, in order for the user to see the broadcast content information related to the broadcast program being viewed through the user terminal (not shown), the broadcast content information display command may be inputted through the input part 245 equipped on the mobile communication terminal 110 and transferred to the control part 240. After receiving the broadcast content information display command as input, the control part 240 may transfer an audio information extraction control command to the sound input part 235 and audio information extraction part 220, to extract the audio information of the broadcast program. Thus, the sound input part 235 can receive the audio information outputted through the user terminal (not shown) as input, and transfer it to the audio information extraction part 220. Also, the audio information extraction part 220 may extract audio patterns according to a predetermined algorithm (e.g. an audio recognition algorithm, etc.) from the audio information inputted through the sound input part 235 and transfer them to the control part 240. Of course, while the mobile communication terminal 110 may transfer the audio information itself extracted from the user terminal (not shown) over a communication network to the broadcast content provider server 120, audio patterns may be extracted according to a predetermined algorithm and transferred to the broadcast content provider server 120, in order to reduce the amount of data transmitted through the communication network. The description below will focus on the extracting of audio patterns by the audio information extraction part 220 according to a predetermined algorithm and the transfer to the control part 240.

Referring to FIG. 3, the broadcast content provider server 120 is composed of a data transceiver part 310, an information analysis part 320, a broadcast content information mapping part 330, an information extraction part 340, and a broadcast content information registration part 350.

The data transceiver part 310 performs the function of exchanging data over a communication network with the mobile communication terminal 110 or a first broadcasting company 130*a*, second broadcasting company 130*b*, . . . , n-th broadcasting company 130*n*. As seen in FIG. 3, the data transceiver part 310 may include a first data transceiver part 302 and a second data transceiver part 305.

The first data transceiver part 302 may provide broadcast content information over a communication network to the mobile communication terminal 110, and may receive the audio information, extracted from a certain broadcast program, from the mobile communication terminal 110 and transfer it to the information analysis part 320.

The second data transceiver part 305 may receive audio information of broadcast programs over a communication network from the first broadcasting company 130*a*, second broadcasting company 130*b*, . . . , n-th broadcasting company 130*n*, and may transfer it to the information extraction part 340.

For convenience in understanding and explanation, the audio information received through the first data transceiver part 302 from the mobile communication terminal 110 will hereinafter be referred to as the first audio information, while the audio information received through the second data transceiver part 305 from each broadcasting company 130 will be referred to as the second audio information.

Here, the broadcast program may be provided over a communication network from the first broadcasting company 130*a*, second broadcasting company 130*b*, n-th broadcasting company 130*n*, and may also be provided through a mobile communication system (not shown). Furthermore, the broadcast program may include all types of broadcast programs provided by airwave broadcasting, satellite broadcasting, satellite DMB, groundwave DMB, and Internet broadcasting, etc. Also, in the present specification, a broadcast program may include not only broadcast programs provided from each broadcasting company 130, but also advertisement broadcasts, etc.

The information analysis part 320 analyzes the first audio information inputted from the first data transceiver part 302 to determine the broadcast program containing the first audio information, and transfers a broadcast content information extraction command related to the broadcast program to the broadcast content information mapping part 330.

For example, the information analysis part 320 may, based on the time information of the first audio information, determine the broadcast program containing the first audio information from the broadcast program audio information database 370, to generate a broadcast content information extraction command and transfer it to the broadcast content information mapping part 330. Here, the broadcast program audio information database 370 may extract the audio information (i.e. second audio information) of broadcast programs inputted from the second data transceiver part 305 in predetermined intervals of time and may store audio patterns obtained according to a predetermined algorithm.

In response to the broadcast content information extraction command inputted through the information analysis part 320, the broadcast content information mapping part 330 reads the broadcast content information from the broadcast content information database 360 and transmits it through the data transceiver part 310 to the mobile communication terminal 110. Here, the broadcast content information database 360 may map and store broadcast content information (e.g. filming location information for a certain scene, filming location reservation information, actor/actress information, actor/actress wardrobe information, survey information, audience participation information, etc.) related to the broadcast programs. That is, the broadcast content information database 360 may map and store supplementary pieces of information corresponding to a broadcast program that are to be transmitted to the mobile communication terminal 110. Here, the broadcast content information may be information related to the broadcast program including text, numbers, images, audio, etc., that can be transmitted to the mobile communication terminal 110, but other types of information not mentioned in the present specification may also be included.

The information extraction part 340 extracts the second audio information, inputted from the second data transceiver part 305, for a predetermined length of time, maps it to a broadcast program, and stores it in the broadcast program audio information database 370.

Here, the information extraction part 340 may extract the audio information of broadcast programs provided through the second data transceiver part 305 from each broadcasting company 130 in predetermined time intervals for a predetermined length of time, and may store it in the broadcast program audio information database 370. Further, when a broadcast content information extraction command is inputted from the information analysis part 320, the information extraction part 340 may also extract the audio information of broadcast programs provided from each broadcasting company 130 and received through the second data transceiver part 305 for a predetermined length of time to store it in the broadcast program audio information database 370.

Moreover, the information extraction part 340 may also extract audio patterns for the audio information of broadcast programs inputted from the second data transceiver part 305 according to an audio recognition algorithm, and store these in the broadcast program audio information database 370.

As the technique of extracting audio patterns from audio information according to an audio recognition algorithm is apparent to those skilled in the art, detailed explanations will not be provided on this matter.

The broadcast content information registration part 350 performs the functions of receiving broadcast programs and/or broadcast content information related to the broadcast programs as input from each broadcasting company, broadcast program producer, or advertisement producer, etc., mapping the broadcast content information to the broadcast programs, and storing it in the broadcast content information database 360. Here, the broadcast programs and the broadcast content information related to the broadcast programs may not necessarily be provided from the same source.

The broadcast content information may be multimedia data provided supplementarily in relation to a broadcast program, and may be text data, numerical data, or image data, etc. For example, assuming that the broadcast program is a television series, the broadcast content information may be the filming location information for a certain scene, filming location reservation information, actor/actress information, actor/actress wardrobe information, survey information, audience participation information, etc., while other types of information may obviously be included.

Figure 4:
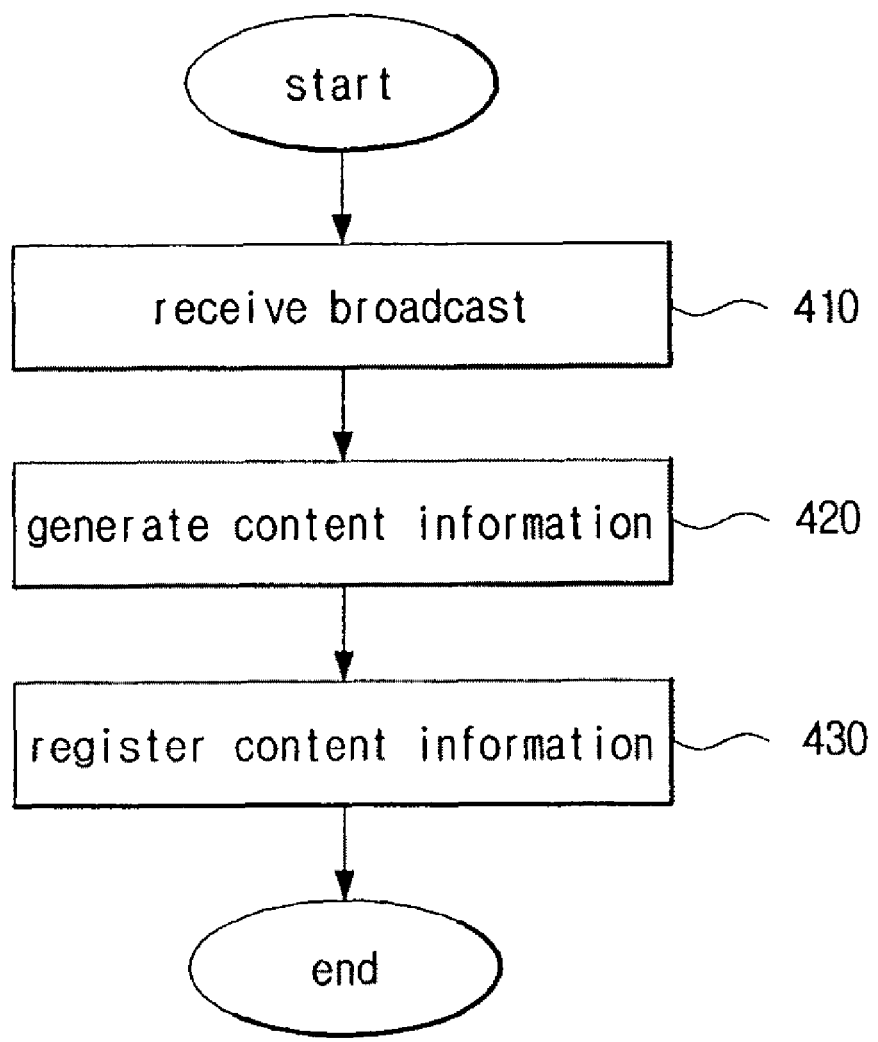
FIG. 4 is a flowchart representing a method by which a broadcast content provider server according to an embodiment of the present invention receives a broadcast program from a broadcasting company to generate and register (store) broadcast content information.

FIG. 4 is a flowchart representing a method by which a broadcast content provider server according to an embodiment of the present invention receives and registers (stores) a broadcast program and/or broadcast content information provided from a broadcasting company. It will be assumed below that the broadcast content provider server and each of the broadcasting companies are connected by a communication network. Aspects of the present invention may not only be applied to broadcast programs provided from broadcasting companies, but may also equally be applied to broadcast programs (e.g. broadcast programs produced by the mobile service provider itself, etc.) that are not delivered through a broadcasting company. Also, the broadcast program provided from a broadcasting company may be a digital broadcast program or may be a regular analog broadcast. For convenience in understanding and explanation, the descriptions below will focus on the processes of generating and registering broadcast content information for broadcast programs (e.g. analog broadcasts) provided from an airwave broadcasting company. Also, while each operation described below is performed at the respective components of the broadcast content provider server 120, these will be referred to collectively as the broadcast content provider server 120 for convenience in understanding and explanation. The descriptions below will focus on receiving a broadcast program and broadcast content information related to the broadcast program through the second data transceiver part 305 from a broadcasting company 130 and mapping to the broadcast program for storing.

In operation 410, the broadcast content provider server 120 receives a broadcast program through a communication network from a broadcasting company (e.g. the first broadcasting company 130*a*, second broadcasting company 130*b*, . . . , n-th broadcasting company 130*n*). Here, the broadcast content provider server 120 may receive not just one broadcast program from a single broadcasting company, but all of the broadcast programs provided from each of the broadcasting companies 130*a*, . . . , 130*n*. However, for convenience in understanding and explanation, the descriptions will focus on receiving one broadcast program (e.g. a first broadcast program) from one broadcasting company (e.g. a first broadcasting company 130*a*) and mapping the broadcast content information related to the broadcast program for storing.

In operation 420, the broadcast content provider server 120 receives broadcast content information (e.g. filming location information for a certain scene, filming location reservation information, actor/actress information, actor/actress wardrobe information, survey information, audience participation information, etc.) related to the first broadcast program received from the first broadcasting company 130*a* as input, and generates the broadcast content information of the broadcast program. Here, the broadcast content information may be information received together with the broadcast program from the first broadcasting company 130*a*, or may be information related to the first broadcast program provided separately.

For example, let us assume that the broadcast program is a commercial advertisement. Then, assuming that the broadcast content information is information (e.g. survey information on the reactions of users to the commercial advertisement, etc.) related to the commercial advertisement provided supplementarily, the broadcast content provider server 120 may map and store the broadcast program and the broadcast content information.

In another example, assuming that the type of broadcast content is a television series, the broadcast content provider server 120 may receive information on the filming location, actor/actress, wardrobe of the actor/actress, accessories of the actor/actress, or props, and relevant purchasing information, etc., for each scene, as input from the broadcast content provider server administrator (not shown), for instance, to generate the broadcast content information.

In operation 430, the broadcast content provider server 120 maps the generated broadcast content information in correspondence with the broadcast program and stores it in the broadcast content information database 360. Here, the broadcast content provider server 120 may also store each type of the generated broadcast content information (e.g. actor/actress information, actor/actress wardrobe or accessory information, wardrobe and accessory purchasing information, etc.) in a respective database (e.g. actor/actress database, actor/actress wardrobe or accessory database, actor/actress wardrobe and accessory purchase database, etc.). Here, these databases (not shown) or the broadcast content information database 360 may also store the URL's that store the respective broadcast content information. If these databases (not shown) or the broadcast content information database 360 thus have URL's stored for the respective pieces of broadcast content information, the broadcast content provider server 120 may read a pertinent URL, and then acquire information from the pertinent URL for transmission to the mobile communication terminal 110.

Figure 5:
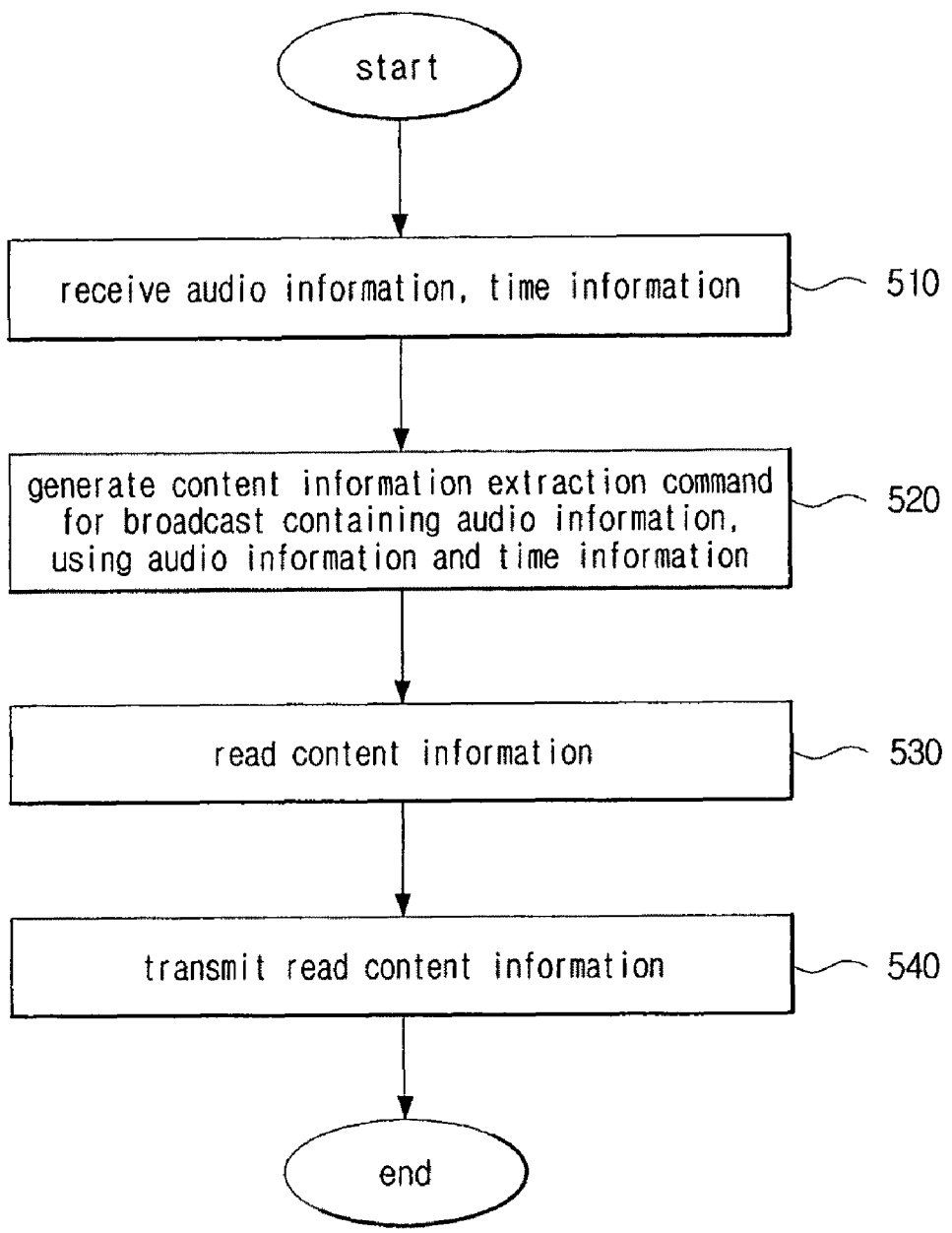
FIG. 5 is a flowchart representing a method by which a broadcast content provider server according to an embodiment of the present invention provides broadcast content information corresponding to a broadcast content over a communication network to a mobile communication terminal.

FIG. 5 is a flowchart representing a method by which a broadcast content provider server according to an embodiment of the present invention provides broadcast content information corresponding to a broadcast program over a communication network to a mobile communication terminal. The broadcast content provider server 120 according to an aspect of the present invention may continuously receive audio information for a certain length of time of a broadcast program from the mobile communication terminal 110, and provide the broadcast content information corresponding to the pertinent audio information over a communication network to the mobile communication terminal 110. The descriptions below will focus on receiving audio information for a certain length of time in predetermined time intervals over a communication network from the mobile communication terminal 110, reading the broadcast content information of the broadcast program corresponding to the pertinent audio information, and providing it in real time over a communication network to the mobile communication terminal 110.

In operation 510, the data transceiver part 310 receives audio information and the time information of the audio information over a communication network from the mobile communication terminal 110, and transfers these to the information analysis part 320. Here, the audio information and the time information of the audio information may also be received continuously in predetermined intervals of time over a communication network from the mobile communication terminal 110. For example, let us assume that the user was viewing a certain broadcast advertisement through a user terminal (not shown). When the user presses a function key designated to correspond to a broadcast content information display command on the mobile communication terminal 110, in order to see broadcast content information related to the broadcast advertisement being viewed or to participate in the broadcast program, the mobile communication terminal 110 may extract and store the audio information of the broadcast advertisement being viewed. Here, the mobile communication terminal 110 may extract and store the audio information for a predetermined length of time (e.g. 5 seconds, 10 seconds, etc.). Also, the mobile communication terminal 110 may store the audio information extraction time (e.g. including the starting time of the audio information extraction and the finishing time of the audio information extraction with respect to the standard time) as well, and transmit it over a communication network to the data transceiver part 310. The data transceiver part 310 may transfer the audio information and time information received from the mobile communication terminal 110 to the information analysis part 320. Here, the time information may include information on the starting time of audio information extraction and the finishing time of audio information extraction, etc., for the audio information extracted from the pertinent broadcast content. Of course, the audio information may be audio patterns extracted according to a predetermined audio recognition algorithm. Moreover, in the present specification, the audio information may be all types of audio information outputted from a broadcast program.

In operation 520, the information analysis part 320 determines the broadcast program containing the audio information using the audio information and the time information of the audio information inputted from the data transceiver part 310, to generate a broadcast content information extraction command and transfer it to the broadcast content information mapping part 330. Here, the time information may be the starting time of audio information extraction, the finishing time of audio information extraction, etc., of the broadcast program of interest.

For example, the information analysis part 320 may determine the broadcast program using the audio information and the time information of the audio information inputted through the data transceiver part 310 and the audio information and the time information of the audio information stored in the broadcast program audio information database 370. Also, the information analysis part 320 may generate a broadcast content information extraction command related to the determined broadcast program and transfer it to the broadcast content information mapping part 330. For example, the broadcast program audio information database 370 may store extracted portions of the audio information of broadcast programs received continuously through the transceiver part 310 from each of the broadcasting companies 130 for a predetermined length of time in predetermined time intervals. Of course, the information analysis part 320 may transfer the broadcast content information extraction command to the broadcast content information generation part 340, where the broadcast content information generation part 340 may extract the audio information of the broadcast programs received from the broadcasting companies 130 for a predetermined length of time at the corresponding point in time, to be stored in the broadcast program audio information database 370.

In operation 530, the broadcast content information mapping part 330, in response to the broadcast content information extraction command inputted from the information analysis part 320, reads the broadcast content information from the broadcast content information database 360 and transfers it to the data transceiver part 310.

As described above, the broadcast content information may be information provided supplementarily in relation to the broadcast program, such as filming location information for a certain scene, filming location reservation information, actor/actress information, actor/actress wardrobe information, survey information, and audience participation information, for instance.

In operation 540, the broadcast content information mapping part 330 transfers the read broadcast content information to the data transceiver part 310, to be transmitted over a communication network to the mobile communication terminal 110.

Figure 6:
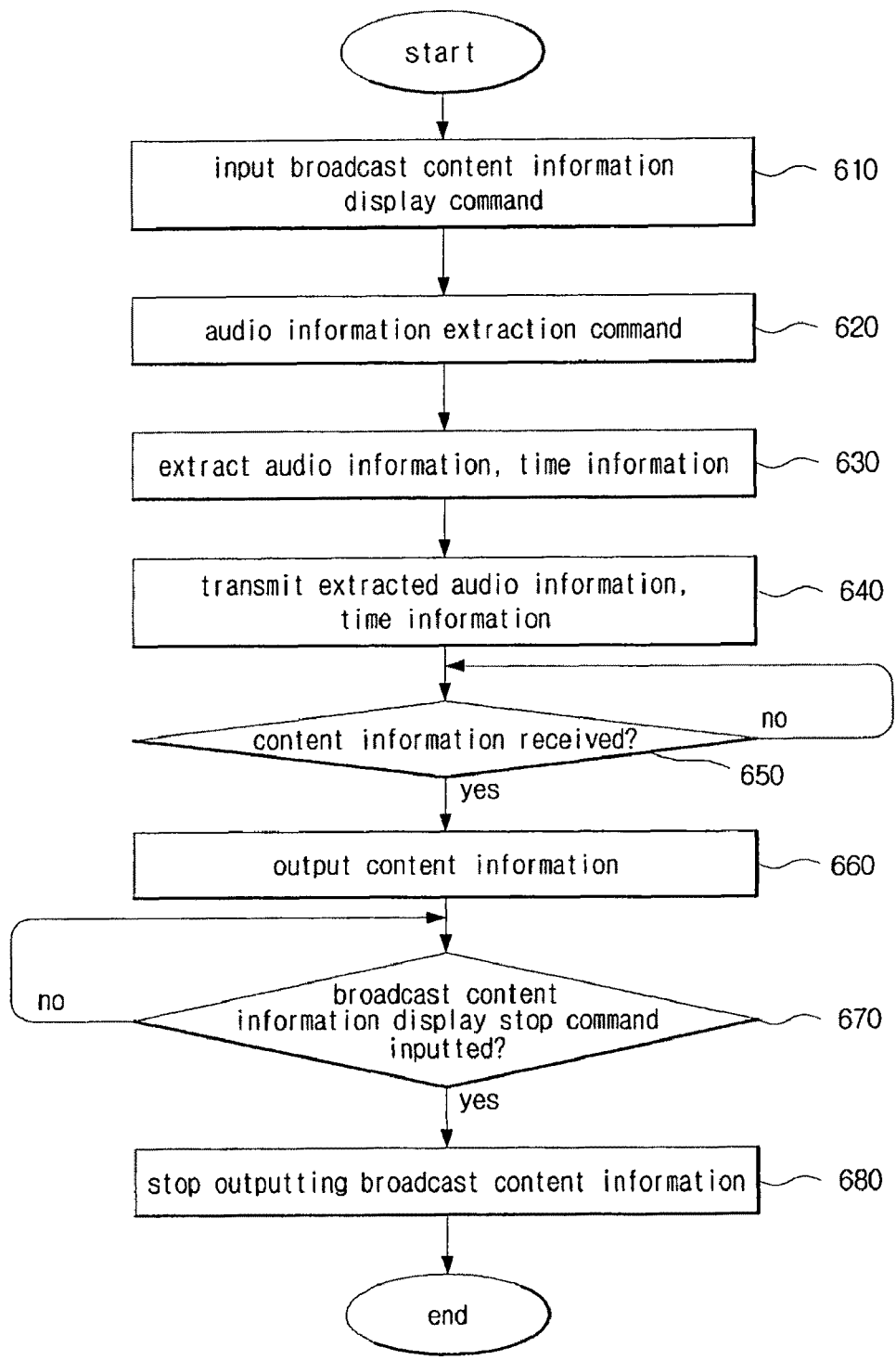
FIG. 6 is a flowchart representing a process by which a mobile communication terminal according to an embodiment of the present invention outputs broadcast content information related to a broadcast content through a display part, from a broadcast content provider server connected by a communication network.
Figure 7:
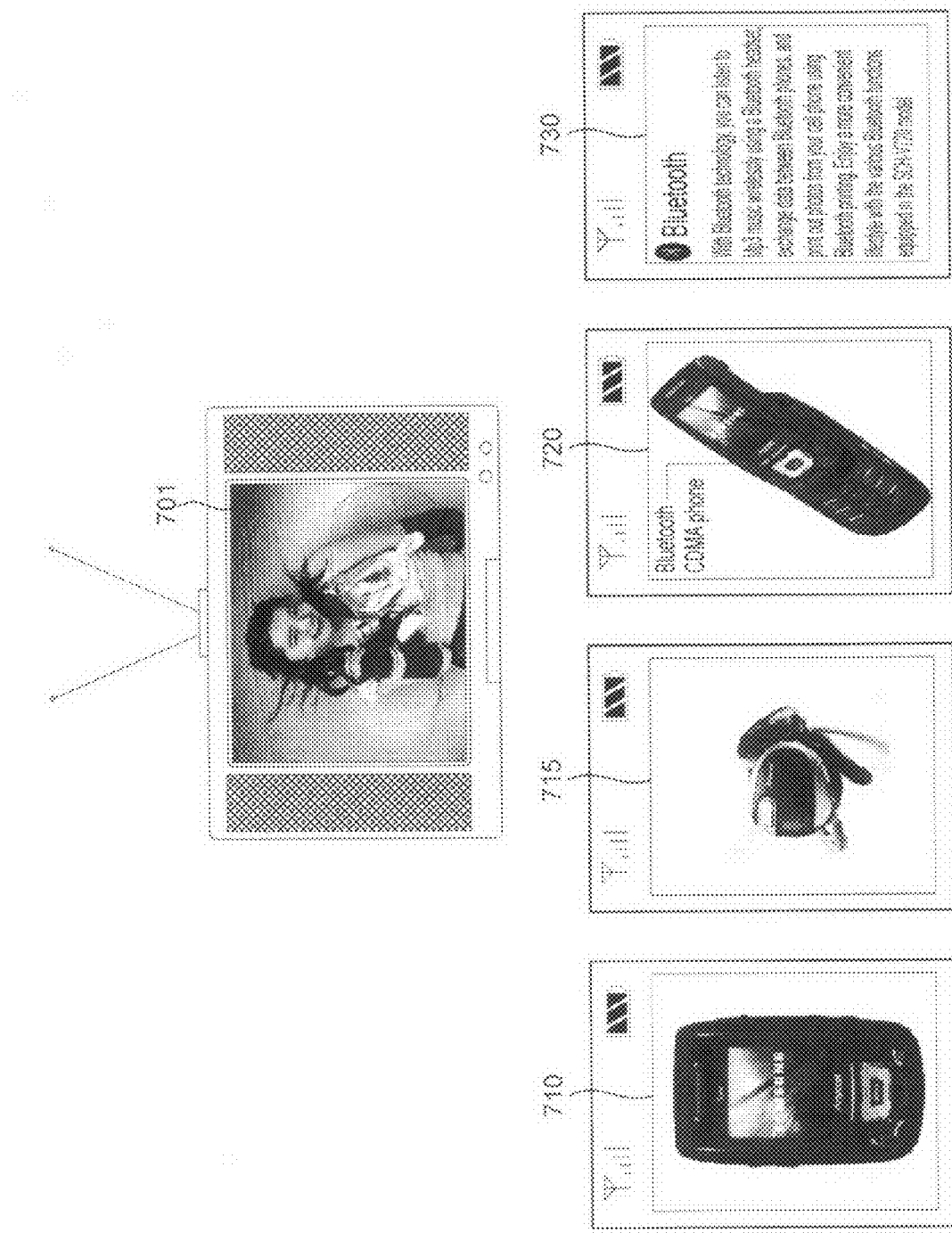
FIG. 7 is a drawing illustrating a mobile communication terminal according to an embodiment of the present invention receiving and outputting a broadcast content or broadcast content information.

FIG. 6 is a flowchart representing a process by which a mobile communication terminal according to an embodiment of the present invention receives broadcast content information related to a broadcast program from a broadcast content provider server connected by a communication network and outputs it through a display part, and FIG. 7 is a drawing illustrating a mobile communication terminal according to an embodiment of the present invention receiving broadcast content information and outputting it through a display part. The descriptions below will assume the case where a broadcast content information provision command related to the broadcast program of interest is transmitted through the mobile communication terminal 110 to the broadcast content provider server 120, and the corresponding broadcast content information is received and outputted, in order for the user to look at broadcast content information about a certain broadcast program while viewing the broadcast program through a user terminal (not shown, e.g. a TV set). The descriptions below will focus on the case where the broadcast program is a certain broadcast advertisement.

The mobile communication terminal 110 according to aspects of the present invention may extract the audio information, for a predetermined length of time, of a broadcast program being viewed or listened to through a user terminal (not shown), and transmit it over a communication network to the broadcast content provider server 120, to receive and output broadcast content information related to the broadcast program containing the pertinent audio information.

In operations 610 to 620, when a function button designated to correspond to the broadcast content display command is pressed by the user through the equipped input part 245, the mobile communication terminal 110 transfers an audio information extraction command to the audio information extraction part 220 and the sound input part 235.

For example, let us assume that the user was viewing an advertisement through a user terminal (not shown), as in 701 of FIG. 7. When the user presses the function button designated to correspond to the broadcast content display command on the mobile communication terminal 110 in order to see the supplementary information of the broadcast advertisement being viewed, the mobile communication terminal 110 may transfer an audio information extraction command to the sound input part 235 for extracting the audio information of the broadcast advertisement being viewed. In response to the audio information extraction command, the sound input part 235 may receive external sounds as input and transfer them to the audio information extraction part 220.

In operation 630, the audio information extraction part 220 receives external sounds from the sound input part 235 by the control of the control part 240, extracts the audio information, and transfers it together with the audio information extraction time information to the control part 240.

For example, the audio information extraction part 220 may perform a pretreatment process for removing noise from the sound information inputted from the sound input part 235, and extract audio patterns from the corresponding sound information using a predetermined audio recognition algorithm. Also, the audio information extraction part 220 may store the starting time of the audio information extraction and the finishing time of the audio information extraction. The audio information extraction part 220 may transfer the extracted audio patterns and the time information to the control part 240.

For example, let us assume that, in the scene of 701, the extraction of the audio information of the broadcast advertisement started at, for instance, 22 hours 20 minutes 10 seconds, and that the extraction of the audio information finished at, for instance, 22 hours 20 minutes 20 seconds. Then, the audio information extraction part 220 may store the extracted audio information and the audio information extraction time (e.g. the audio information extraction starting time, audio information extraction finishing time) and then transfer them to the control part 240.

In operation 640, the control part 240 transmits the audio information and time information inputted from the audio information extraction part 220 through the transceiver part 210 to the broadcast content provider server 120.

Here, when the content provider server 120 receives the audio information and time information (e.g. audio information extraction starting time, audio information extraction finishing time, etc.) from the mobile communication terminal 110, it may use the audio information and time information to determine the broadcast program containing the corresponding audio information from the broadcast program audio information database 370, read the broadcast content information related to the determined broadcast program from the broadcast content information database 360, and transmit it over a communication network to the mobile communication terminal 110.

For example, let us assume that the broadcast program audio information database 370 extracts the audio information of broadcast programs received from each of the broadcasting companies 130 continuously in predetermined time intervals for a predetermined length of time, and stores the extracted audio information and time information such that they are mapped to the respective broadcast programs. Then, using the time information received from the mobile communication terminal 110, the content provider server 120 may extract the broadcast programs being broadcasted in the same time period. Also, the broadcast content provider server 120 may determine the broadcast program containing audio information identical to the audio information received from the mobile communication terminal 110, read the broadcast content information related to the determined broadcast program from the broadcast content information database 360, and transmit it over a communication network to the mobile communication terminal 110.

In operation 650, the control part 240 determines whether or not the broadcast content information has been received through the transceiver part 210 from the broadcast content provider server 120.

If the broadcast content information has been received, the control part 240, in operation 660, may output the received broadcast content information through the display part 215 and sound output part 230.

For example, let us assume that the broadcast content information received from the broadcast content provider server 120 is supplementary information including multimedia data (such as numerical data, text data, image data, audio data, etc.), as in 710 to 740 of FIG. 7. The mobile communication terminal 110 may repeatedly output the broadcast content information received from the broadcast content provider server 120 in relation to the broadcast advertisement. Examples of broadcast content information related to a broadcast advertisement are illustrated in 710 to 740 of FIG. 7.

In operation 670, the control part 240 determines whether or not a function button designated to correspond to a broadcast content information display stop command has been pressed by the user through the input part 245.

If the broadcast content information display stop command has been inputted, the control part 240, in operation 680, does not transfer the pertinent broadcast content information to the sound output part 230 and display part 215, so that the broadcast content information is not outputted.

However, if the broadcast content information display stop command has not been inputted, it remains in stand-by in operation 680.

As described above, the audio information of a broadcast program being viewed and/or listed to by the user through a user terminal (not shown) may be extracted through the mobile communication terminal 110 and transmitted to the broadcast content provider server 120, whereby the broadcast content information provided supplementarily in relation to the broadcast program of interest may be received and outputted.

In another example, while viewing a broadcast advertisement through a user terminal (not shown) as in 701 of FIG. 7, a user may also be provided with survey information related to the broadcast advertisement through the mobile communication terminal 110, at which the corresponding response information may be transferred to the broadcast content provider server 120.

The embodiments of the present invention set forth above are disclosed for illustrative purposes. It is to be appreciated that various changes, modifications, and additions can be made by those with ordinary skill in the art without departing from the spirit and scope of the present invention, and that such changes, modifications, and additions are encompassed within the claims stated below.

What is claimed is:

1. A broadcast content provider server connected to a mobile communication terminal over a communication network to provide a broadcast content to the mobile communication terminal, the broadcast content provider server comprising:

a first data transceiver configured to receive audio information of the broadcast content and time information related to the broadcast content from the mobile communication terminal;

a second data transceiver configured to receive a broadcast program from one or more broadcasting companies;

an information extractor configured to extract audio information from the received broadcast program for a predetermined length of time in predetermined time intervals, so as to map the extracted audio information to the broadcast program and store the mapped audio and broadcast program information in a broadcast program audio information database;

a broadcast content information registration unit configured to map the broadcast program to corresponding broadcast content information and store the mapped broadcast content and program information in a broadcast content information database;

an information analyzer configured to determine a broadcast program containing the received audio information, using the received audio and time information, and to generate a broadcast content information extraction command; and a broadcast content information mapper configured to read broadcast content information related to the determined broadcast program from the broadcast content information database, in response to the broadcast content information extraction command, wherein the broadcast content provider server is configured to provide the read broadcast content information to the mobile communication terminal through the first data transceiver.

2. The broadcast content provider server of claim 1, wherein the broadcast content information comprises supplementary pieces of information corresponding to the broadcast program to be transmitted to the mobile communication terminal.

3. The broadcast content provider server of claim 2, wherein the supplementary pieces of information comprises at least one of the following: filming location information for a certain scene, filming location reservation information, actor/actress information, actor/actress wardrobe information, survey information and audience participation information.

4. The broadcast content provider server of claim 1, wherein the broadcast content information comprises any one of text data, numerical data, image data, or audio data supplementarily provided in relation to a broadcast program, or a combination thereof.

5. The broadcast content provider server of claim 1, wherein the audio information comprises audio information extracted from the broadcast program for a predetermined length of time, and wherein the time information comprises starting time of the audio information extraction and finishing time of the audio information extraction.

6. The broadcast content provider server of claim 1, wherein the broadcast content is provided for any one broadcast of airwave broadcast, satellite broadcast, groundwave DMB broadcast, and satellite DMB broadcast, and comprises any one of analog broadcast and digital broadcast.

7. A method of providing broadcast content information performed in a broadcast content provider server connected to a mobile communication terminal and one or more broadcasting companies over a communication network to provide broadcast content information to the mobile communication terminal, the method comprising:

receiving a broadcast program from the broadcasting company;

extracting audio information from the broadcast program in predetermined intervals of time, so as to map the extracted audio information to the broadcast program and store the mapped audio and broadcast program information in a broadcast program audio information database;

receiving a broadcast program or broadcast content information related to the broadcast program;

mapping the received broadcast program and broadcast content information and storing the mapped information in a broadcast content information database;

receiving audio information and time information related to the audio information from the mobile communication terminal;

determining a broadcast program containing the received audio information, using the received audio and time information, and generating a broadcast content information extraction command related to the determined broadcast program;

reading broadcast content information, in response to the broadcast content information extraction command, from the broadcast content information database; and transmitting the read broadcast content information to the mobile communication terminal.

8. The method of claim 7, wherein the broadcast content information comprises supplementary pieces of information corresponding to the broadcast program to be transmitted to the mobile communication terminal.

9. The method of claim 8, wherein the supplementary pieces of information comprises at least one of the following: filming location information for a certain scene, filming location reservation information, actor/actress information, actor/actress wardrobe information, survey information and audience participation information.

10. A system for providing broadcast content information performed in a broadcast content provider server connected to a mobile communication terminal and one or more broadcasting companies over a communication network to provide broadcast content information to the mobile communication terminal, the system comprising:

means for receiving a broadcast program from the broadcasting company, means for extracting audio information from the broadcast program in predetermined intervals of time, and for mapping the extracted audio information to the broadcast program and storing the mapped audio and broadcast program information in a broadcast program audio information database;

means for receiving a broadcast program or broadcast content information related to the broadcast program, means for mapping the received broadcast program and broadcast content information and storing the mapped information in a broadcast content information database;

means for receiving audio information and time information related to the audio information from the mobile communication terminal;

means for determining a broadcast program containing the received audio information, using the received audio and time information, and generating a broadcast content information extraction command related to the determined broadcast program;

means for reading broadcast content information, in response to the broadcast content information extraction command, from the broadcast content information database; and means for transmitting the read broadcast content information to the mobile communication terminal.

11. The system of claim 10, wherein the broadcast content information comprises supplementary pieces of information corresponding to the broadcast program to be transmitted to the mobile communication terminal.

12. The system of claim 11, wherein the supplementary pieces of information comprises at least one of the following: filming location information for a certain scene, filming location reservation information, actor/actress information, actor/actress wardrobe information, survey information and audience participation information.

13. A method of receiving broadcast content information from a broadcast content provider server connected to a mobile communication terminal and one or more broadcasting companies over a communication network to provide broadcast content information to the mobile communication terminal, the method comprising:

transmitting audio information and time information related to the audio information to the broadcast content provider server, and receiving a broadcast content information from the broadcast content provider server, wherein the broadcast content provider server receives a broadcast program from the broadcasting company, extracts audio information from the broadcast program in predetermined intervals of time, for mapping the extracted audio information to the broadcast program and storing the mapped audio and broadcast program information in a broadcast program audio information database, receives a broadcast program or broadcast content information related to the broadcast program, maps the inputted broadcast program and the broadcast content information and storing in a broadcast content information database, determines a broadcast program containing the received audio information, using the received audio and time information, generates a broadcast content information extraction command related to the determined broadcast program, and reads broadcast content information, in response to the broadcast content information extraction command, from a broadcast content information database storing broadcast content information related to broadcast programs.

14. A system for receiving broadcast content information from a broadcast content provider server connected to a mobile communication terminal and one or more broadcasting companies over a communication network to provide broadcast content information to the mobile communication terminal, the system comprising:

means for transmitting audio information and time information related to the audio information to the broadcast content provider server, and means for receiving a broadcast content information from the broadcast content provider server, wherein the broadcast content provider server is configured to i) receive a broadcast program from the broadcasting company, ii) extract audio information from the broadcast program in predetermined intervals of time, so as to map the extracted audio information to the broadcast program and store the mapped audio and broadcast program information in a broadcast program audio information database, iii) receive a broadcast program or broadcast content information related to the broadcast program, iv) map the inputted broadcast program and the broadcast content information and store the mapped information in a broadcast content information database, v) determine a broadcast program containing the received audio information, using the received audio and time information, vi) generate a broadcast content information extraction command related to the determined broadcast program, and vii) read broadcast content information, in response to the broadcast content information extraction command, from a broadcast content information database storing broadcast content information related to broadcast programs.

* * * * *